(12) United States Patent
Fenger

(10) Patent No.: US 12,092,073 B2
(45) Date of Patent: Sep. 17, 2024

(54) WIND TURBINE TOWER WITH CRANE CONNECTION ELEMENTS AND A CRANE WITH TOWER FLANGE CONNECTION ELEMENTS

(71) Applicant: LIFTRA IP APS, Aalborg SV (DK)

(72) Inventor: Per Eske Fenger, Terndrup (DK)

(73) Assignee: LIFTRA IP APS, Aalborg SV (DK)

( * ) Notice: Subject to any disclaimer, the term of this patent is extended or adjusted under 35 U.S.C. 154(b) by 161 days.

(21) Appl. No.: 17/612,724

(22) PCT Filed: May 21, 2020

(86) PCT No.: PCT/EP2020/064238
§ 371 (c)(1),
(2) Date: Nov. 19, 2021

(87) PCT Pub. No.: WO2020/234435
PCT Pub. Date: Nov. 26, 2020

(65) Prior Publication Data
US 2022/0235739 A1    Jul. 28, 2022

(30) Foreign Application Priority Data
May 21, 2019   (DK) .............................. PA201970322

(51) Int. Cl.
*F03D 13/10*   (2016.01)
*B66C 1/10*    (2006.01)
(Continued)

(52) U.S. Cl.
CPC .............. *F03D 13/10* (2016.05); *B66C 1/108* (2013.01); *B66C 23/207* (2013.01); *F03D 13/20* (2016.05);
(Continued)

(58) Field of Classification Search
CPC ....... F03D 13/10; F03D 13/20; B66C 23/207; B66C 23/32; B66C 1/108; B66C 23/185; F05B 2230/61; F05B 2240/912
See application file for complete search history.

(56) References Cited

U.S. PATENT DOCUMENTS 2,720,694 A * 10/1955 Hines .................... B66C 23/208
29/469
3,074,564 A * 1/1963 Davis ...................... B66C 23/32
212/204
(Continued)

FOREIGN PATENT DOCUMENTS

CN           2777235 Y      5/2006
CN         101590982 A     12/2009
(Continued)

*Primary Examiner* — Andrew J Triggs
(74) *Attorney, Agent, or Firm* — Birch, Stewart, Kolasch & Birch, LLP

(57) ABSTRACT

A crane (2) comprising a base portion (4), two arms (6, 8) displaceably connected to the base portion and a lifting boom (22) displaceably connected to the base portion, said lifting boom being provided with a lifting wire (32) and a lifting member (30), for example a lifting hook, for lifting a load, wherein the two arms and the base portion in combination comprise at least three tower flange connection element (10) is arranged to be detachably connectable to cooperating crane connection elements on a flange of a wind turbine tower section, wherein each arm comprises one of the tower flange connection elements, and wherein the vertical distance between any two tower flange connection elements in the normal operating position of the crane is less than 1 m, less than 50 cm or less than 25 cm. In this way a crane is provided which can be attached to a flange located at the upper portion of a tower section.

7 Claims, 15 Drawing Sheets

(51) Int. Cl.
*B66C 23/20* (2006.01)
*F03D 13/20* (2016.01)

(52) U.S. Cl.
CPC ..... *F05B 2230/604* (2013.01); *F05B 2230/61* (2013.01); *F05B 2240/912* (2013.01)

(56) References Cited

U.S. PATENT DOCUMENTS

| | | | |
|---|---|---|---|
| 10,843,907 B2 * | 11/2020 | Lagerweij | ............... F03D 13/10 |
| 2016/0010621 A1 | 1/2016 | Zuteck | |

FOREIGN PATENT DOCUMENTS

| | | | | |
|---|---|---|---|---|
| CN | 108821133 A | 11/2018 | | |
| DE | 19741988 A1 | 4/1999 | | |
| DE | 202011001850 U1 | 4/2012 | | |
| EP | 1857670 A1 * | 11/2007 | ........... | B66C 23/207 |
| EP | 2677166 A1 | 12/2013 | | |
| EP | 2746571 A2 * | 6/2014 | ........... | B66C 23/207 |
| WO | WO 2011/050812 A1 | 5/2011 | | |
| WO | WO-2013113377 A1 * | 8/2013 | ........... | B66C 23/207 |
| WO | WO 2014/071949 A1 | 5/2014 | | |
| WO | WO 2017/055598 A1 | 4/2017 | | |

* cited by examiner

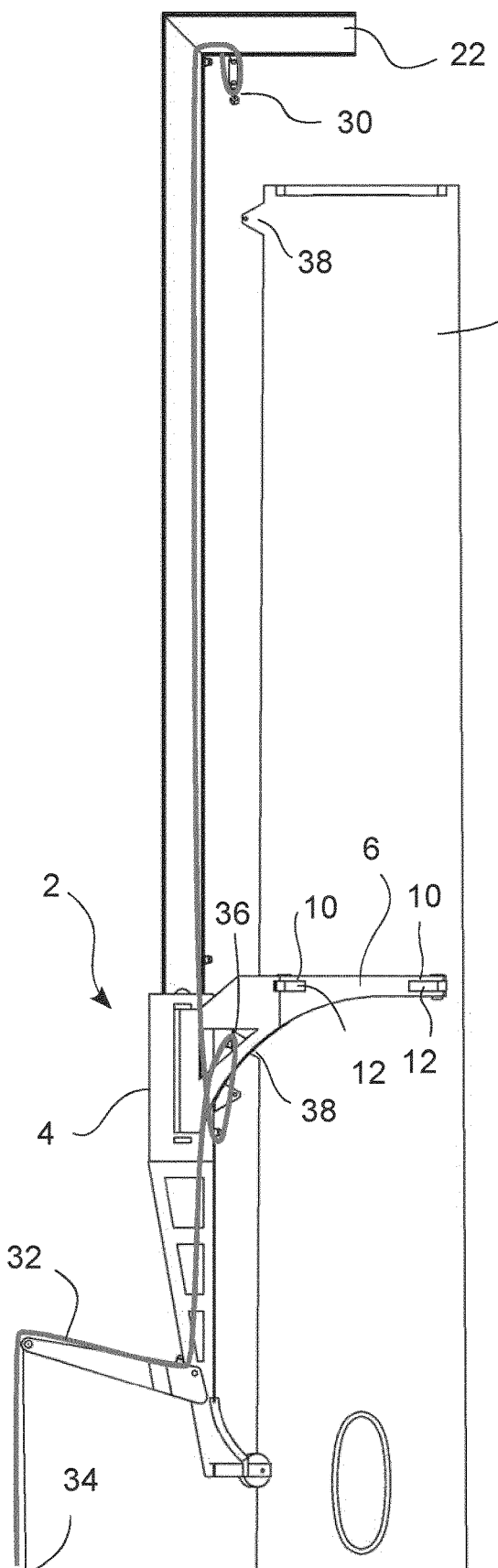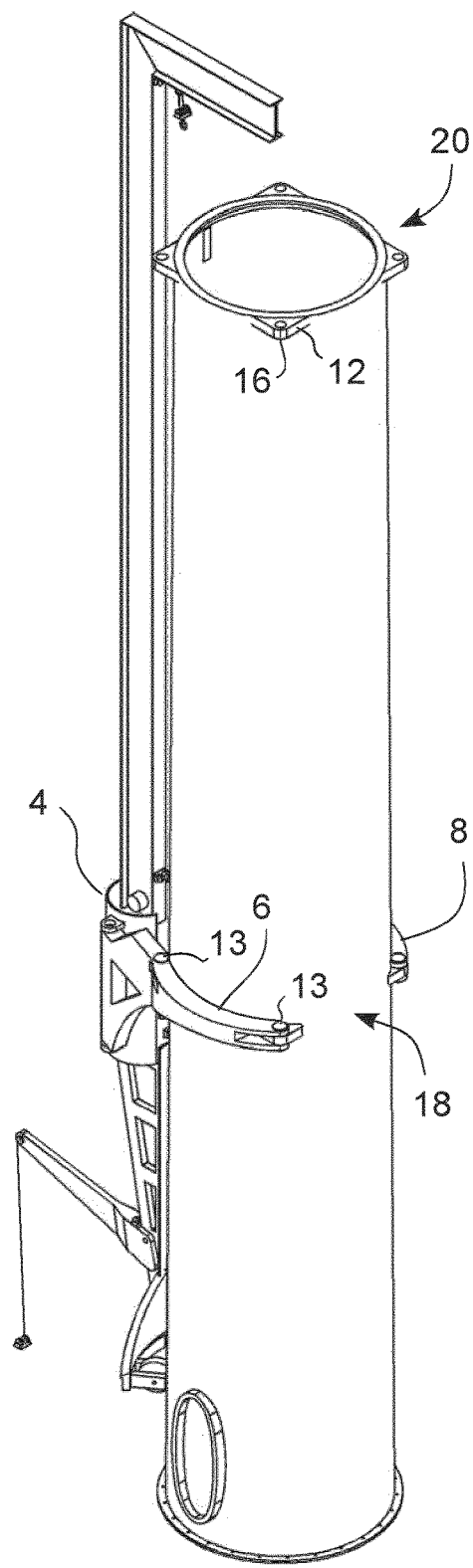
Fig. 1a
Fig. 1b

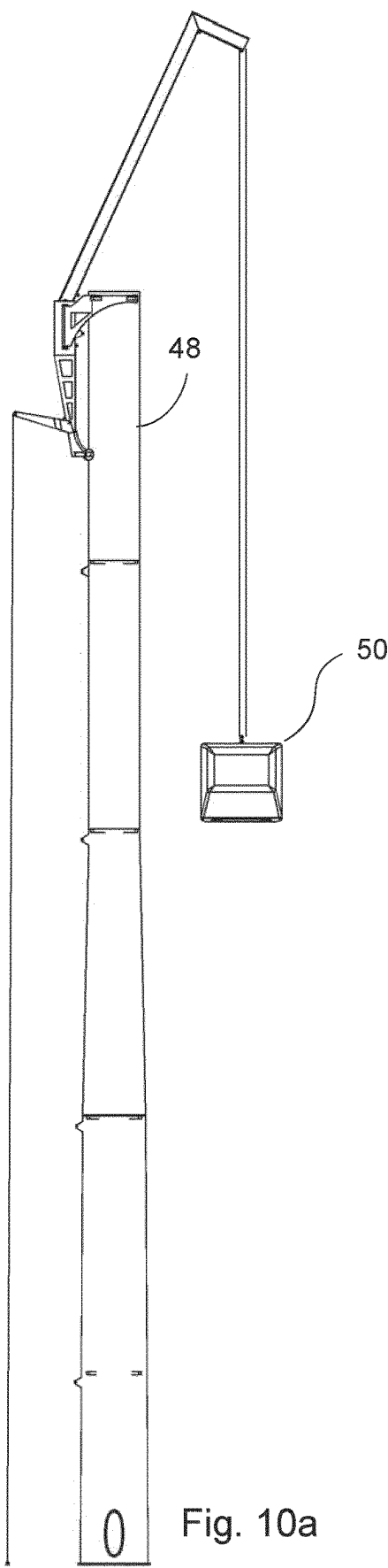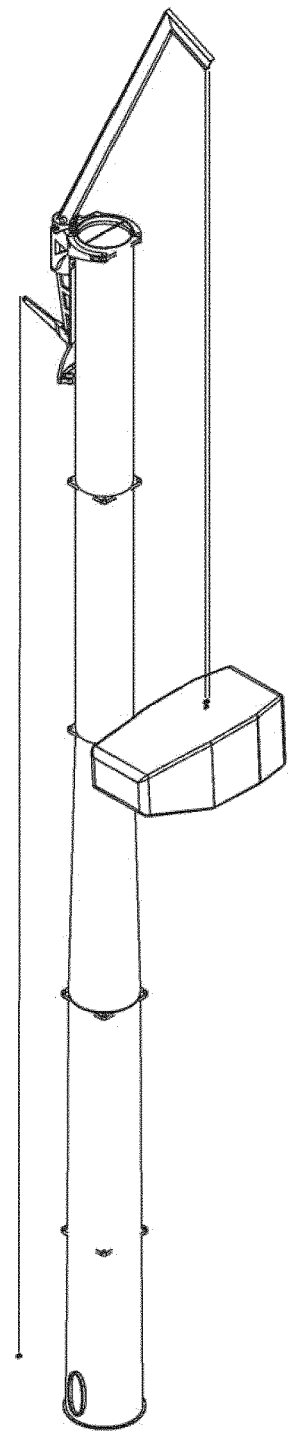
Fig. 10a
Fig. 10b

WIND TURBINE TOWER WITH CRANE CONNECTION ELEMENTS AND A CRANE WITH TOWER FLANGE CONNECTION ELEMENTS

The current invention relates to a wind turbine tower with crane connection elements and a crane for being connected to crane connection elements on a wind turbine tower. The current invention also relates to a method of assembling a wind turbine tower with the crane.

It should be noted that the term "wind turbine tower" should be understood as a tower for a wind turbine. This could either refer to the final completed tower or to a tower which is in the process of being assembled. For example, a single tower section anchored on the ground, is considered a wind turbine tower under construction according to the current specification. The term "wind turbine tower" as used in the claims should cover this partially assembled wind turbine tower.

The current specification also discloses independent inventions directed to a novel self-hoisting crane and to a crane with a novel moment compensating mechanism.

DESCRIPTION OF RELATED ART

Typically when doing maintenance and/or construction of a wind turbine tower or when doing maintenance of a previously installed wind turbine, a crane is erected at the maintenance/construction site. The crane needs to have a vertical extension which is greater than the height of the wind turbine tower in order to be able to lift components to the top of the wind turbine tower. As wind turbines and wind turbine towers continue to grow in size, the cranes need to be larger and larger. This is a problem both when transporting the crane to the maintenance/construction site and when setting up the crane. Especially in offshore locations, erecting such large cranes and providing a firm base for them to work from is very difficult.

Instead of building a crane beside the tower, it is also known to hoist smaller cranes to the top of a wind turbine tower to help with maintenance and repairs. In this way, instead of erecting a large crane beside the wind turbine tower, the wind turbine tower itself can be used as the main structure of the crane. Examples of such cranes are provided in WO2014/071949 and WO2011/050812. Such cranes can be attached to the wind turbine tower in different ways. In the two previously mentioned documents, the crane is attached to a fixture located in the nacelle of the wind turbine.

In other cases, the crane can be hoisted to the top of the wind turbine tower with a block and tackle and then clamped to the tower itself via bands or arms which wrap around the tower. In order to be able to support the moments which the crane experiences during the lifting operations, multiple bands or arms are required, the arms being separated by a vertical distance on the tower. When forming the bands or arms, it is important that the bands or arms don't damage the tower structure when clamping onto the tower and when using the crane.

It is also known to attach a crane via a track system which extends up along one side of the wind turbine tower. This system is disclosed in WO2017/055598. In this case, the crane can also be used to assemble the tower itself and "climb" the tower as the tower is built.

From another type of tower (non wind turbine) it is known to provide each tower section with multiple vertically spaced brackets on the side surface of each tower section. A crane can then be attached to these brackets via multiple vertically spaced arms on the crane. See U.S. Pat. No. 2,720,694.

However the prior art solutions all suffer from various drawbacks. Some of the systems are relatively complex. Other systems require a large crane structure. Other systems require an existing tower and a connection to the top of the tower to be able to hoist the crane into place. Other systems require complicated brackets attached to the surface of the tower sections.

SUMMARY OF THE INVENTION

It is therefore a first aspect of the current invention to provide a wind turbine tower and a crane whereby the crane can be attached to the wind turbine tower in a simple manner.

A second aspect of the current invention is to provide a wind turbine tower and a crane whereby the crane is self hoisting, such that it can hoist itself to the top of the wind turbine tower.

A third aspect of the current invention is to provide a wind turbine tower and a crane whereby the crane can be used during the assembly of the wind turbine tower.

At least some of these aspects are solved by a wind turbine tower comprising a first tower section, said first tower section having an upper flange arranged at an upper end of the first tower section, said upper flange comprising one or more flange portions which extend(s) horizontally out past the outer surface of the main body of the first tower section, said one or more flange portion(s) together comprising at least three crane connection elements, the vertical distance between any two of said at least three crane connection elements being less than 1 m, each of said at least three crane connection elements being arranged such that a cooperating tower flange connection element on a crane can be detachably connected to said crane connection element, and being spaced around the circumference of the first tower section. In this way, the crane can be attached to the flange itself. This is in contrast to prior art solutions where the crane needs to be strapped or connected to the outer surface of the tower sections which can result in damage to the tower section. Furthermore, most tower sections already have a flange arranged at the upper portion of the tower section for establishing a bolted connected to the next tower section, and or to the nacelle of the wind turbine. Hence, relatively small changes need to be made to the existing flange, or a simple extra flange could be added to the existing flange to be able to provide the crane connection elements.

For the sake of this specification, the term "crane connection element" should be understood as an element which is arranged to establish a safe, secure and detachable connection to another element. This is in contrast to existing flanges on wind turbine tower sections which might have areas to which a connection can be made, but do not have specifically arranged connection elements. A crane connection element should be able to provide a detachable connection to a crane which is secure and which can support the loads provided by the crane.

In one embodiment, the at least three crane connection elements are arranged such that a crane connected to said at least three crane connection elements can safely support a load of at least 10 tons, at least 20 tons, at least 30 tons or at least 60 tons arranged at least 6 m in a horizontal distance from the centre of the tower section.

In one embodiment, the at least three crane connection elements are arranged such that a horizontal component of a vector A between a first set of two connection elements has a length of at least 200 cm and a horizontal component of a vector B between a second set of two connection elements has a length of at least 200 cm.

In one embodiment, the flange and the at least three crane connection elements are designed such that a first set of two connection elements can safely support a moment about one of said two connection elements of at least 1,750,000 Nm and in that a second set of two connection elements can support a moment about one of said two connection elements of at least 1,750,000 Nm. This is equal to a load of 60 Tons at 6 m from the base of the crane shared between two supports. In another embodiment, the moments should be at least 3.500.000 Nm.

According to this specification, "safely support" should be understood to mean that a moment can be applied to the connection elements without causing undue deformation of the flange/crane/tower section and without risking any damage to the flange/crane. An engineer with experience in mechanical engineering will easily be able to define the limits of what "safely supports" means for a specific construction.

In one embodiment, one of said at least three crane connection elements is arranged on one side of a vertical plane P passing through another one of said three crane connection elements and the centre axis of the first tower section and another one of said three crane connection elements is arranged on another side of the vertical plane P.

In one embodiment, the vertical distance between any two of said at least three crane connection elements is less than 50 cm or less than 25 cm. In one embodiment, said at least three crane connection elements are arranged on essentially the same horizontal plane. In one embodiment, the vertical distance between any three of said at least three crane connection elements is less than 50 cm or less than 25 cm. In one embodiment, the vertical distance between the uppermost of any three of said at least three crane connection elements and the lowermost of any three of said at least three crane connection elements is less than 50 cm or less than 25 cm.

In one embodiment, the flange comprises four crane connection elements, and a vector A between a first and a second crane connection element has a length of at least 200 cm and a vector B between a third and a fourth crane connection element has a length of at least 200 cm. In one embodiment, the length of the horizontal component of the vector A and the length of the horizontal component of the vector B are the same.

In one embodiment, the first and second crane connection elements are arranged on a first side of a vertical plane P passing through the central axis of the first tower section and the third and fourth crane connection elements are arranged on the other side of the vertical plane.

In one embodiment, the wind turbine tower further comprises a second tower section arranged on top of the first tower section, the second tower section having an upper flange comprising one or more flange portions which extend(s) horizontally out past the outer surface of the main body of the first tower section, said one or more flange portion(s) together comprising at least three crane connection elements, the vertical distance between any two of said at least three crane connection elements being less than 1 m, each of said at least three crane connection elements being arranged such that a cooperating tower flange connection element on a crane can be detachably connected to said crane connection element and being spaced around the circumference of the first tower section. In this way, a crane can be attached to the flange of the first tower section and/or to the flange of the second tower section.

In one embodiment, the at least three crane connection elements of the upper flange of the second tower section are arranged such that a crane connected to said at least three crane connection elements can safely support a load of at least 10, at least 20, at least 40 or at least 60 tons arranged at least 6 m in a horizontal distance from the centre of the second tower section.

In one embodiment, the crane connection elements of the second tower section are arranged such that a horizontal component of a vector C between a first set of two crane connection elements has a length of at least 200 cm and a horizontal component of a vector D between a second set of two crane connection elements has a length of at least 200 cm and in that the angle between the vectors A and B is greater than the angle between the vectors C and D. In this way a crane can be connected to either the first or the second flange with the same connection elements, even though the diameter of the tower sections might be different. In one embodiment, the length of the vectors A and C is the same and the length of the vectors B and D is the same. In one embodiment, the outer diameter of the main body of the second tower section at the location of the upper flange of the second tower section is less than the outer diameter of the main body of the first tower section at the location of the upper flange of the first tower section.

In one embodiment, the vertical distance between any two of said at least three crane connection elements of the second tower section is less than 50 cm or less than 25 cm. In one embodiment, said at least three crane connection elements of the second tower section are arranged on essentially the same horizontal plane. In one embodiment, the vertical distance between any three of said at least three crane connection elements of the second tower section is less than 50 cm or less than 25 cm. In one embodiment, the vertical distance between the uppermost of any three of said at least three crane connection elements of the second tower section and the lowermost of any three of said at least three crane connection elements of the second tower section is less than 50 cm or less than 25 cm.

The invention also relates to a crane comprising a base portion, two arms displaceably connected to the base portion and a lifting boom displaceably connected to the base portion, said lifting boom being provided with a lifting wire and a lifting member, for example a lifting hook, for lifting a load, characterized in that the two arms and the base portion in combination comprise at least three tower flange connection elements arranged to be detachably connectable to cooperating crane connection elements on a flange of a wind turbine tower section, in that each arm comprises one of the tower flange connection elements, and in that the vertical distance between any two tower flange connection elements in the normal operating position of the crane is less than 1 m, less than 50 cm or less than 25 cm. In this way, the crane can be attached to the tower section, directly at the flange and the majority of the loads can be supported by the flange. This is in contrast to prior art cranes which need to be attached at multiple points separated by a large vertical distance on the body of the tower section.

According to the current specification, the term "tower flange connection element" should be understood as an element which is arranged to establish a safe, secure and detachable connection to the tower flange. The tower flange connection elements should be able to be suitable for use in the method described below where the crane is repeatedly attached and detached from different tower flanges. The tower flange connection elements should therefore be suitable for frequent detaching and re-attaching.

According to the current specification, the term displaceably should be understood as including different types of motion paths. In the description and in the figures, the arms of the crane are shown as being pivotably connected to the base portion of the crane. However, within the scope of the current invention, the arms could also be displaceably connected to the base portion in other ways than pivotable. In one embodiment, the arms are pivotably connected to the base portion. In one embodiment, the arms are linearly displaceably connected to the base portion. In one embodiment, the displacement path of the arms can have both linear and rotational components. The same is true for the lifting boom. The lifting boom can take different forms as is known in the art and be connected in different ways to the base portion.

In one embodiment, the base portion, the arms and the tower flange connection elements are arranged such the lifting member can safely lift a load of at least 10 tons, at least 20 tons, at least 30 tons or at least 60 tons when the lifting member is placed at a horizontal distance of at least 6 m from at least one of said at least three tower flange connection elements.

In one embodiment, the tower flange connection elements are arranged such that a vector E between a first set of two tower flange connection elements has a length of at least 200 cm and a vector F between a second set of two tower flange connection elements has a length of at least 200 cm. In one embodiment, the length of the horizontal components of the above mentioned vectors is at least 200 cm.

In one embodiment, the base portion, the two arms and the tower flange connection elements are arranged such that the crane can safely support a moment about one of the tower flange connection elements of at least 1.750.000 Nm. In one embodiment, the arms are pivotably connected to the base portion. In one embodiment, the arms are arranged to pivot about vertical axes. In one embodiment, the arms are arranged to be arranged on either side of a vertical plane P passing through the centre axis of a tower section, when the crane is attached to the tower section. In one embodiment, said three tower flange connection elements are arranged on essentially the same plane in the normal operating position of the crane.

In one embodiment, the crane comprises four tower flange connection elements and in that each of the two arms comprises two tower flange connection elements. In one embodiment, the two tower flange connection elements on a first arm and the two tower flange connection elements on a second arm are arranged on opposite sides of a vertical plane passing through the centre axis of a tower section, when the crane is attached to the tower section.

In one embodiment, the crane comprises four tower flange connection elements and four arms, each arm comprising one of the four tower flange connection elements.

In one embodiment, the vertical distance between any three of the at least three tower flange connection elements is less than 50 cm or less than 25 cm.

In one embodiment, the at least three tower flange connection elements are arranged on essentially the same horizontal plane.

In one embodiment, the crane further comprises a wire and pulley system comprising the lifting wire and the lifting member.

In one embodiment, the lifting wire is connected to a winch located remotely from the crane. According to this specification, the phrase "located remotely from the crane" should be understood as being located separately from the crane, such that as the crane moves up or down on the tower, the winch does not move the same amount. In a typical situation, the crane will be connected to a wind turbine tower such that it can move up and down the wind turbine tower, while the winch will be located near the base of the wind turbine tower to which the crane is connected. In one embodiment, the only connection between the crane and the winch is the wire.

In one embodiment, the wire and pulley system comprises a lower pulley block comprising a pulley and an upper pulley block comprising at least one more pulley than the lower pulley block, the upper pulley block comprising the lifting member and the lower pulley block comprising a first connection element suitable for establishing a detachable connection to the lifting member and a second connection element suitable for establishing a detachable connection to a crane hoisting connection element arranged on a tower section of a wind turbine tower when the crane is connected to a tower section.

In one embodiment, the second connection element is strong enough to safely support the weight of the crane. In one embodiment, the upper and lower pulley blocks are arranged to displace vertically between an upper portion of the lifting boom and a lower portion of the base portion. In one embodiment, the crane further comprises a lower pulley fixed to the base portion of the crane and an upper pulley fixed to an upper portion of the lifting boom, said lower pulley being arranged below the lower pulley block and said upper pulley being arranged above the upper pulley block, said lifting wire passing up from the winch, over the lower pulley block, down to the lower pulley, up to the upper pulley and down to the upper pulley block.

In one embodiment, the crane further comprises a moment compensating mechanism comprising a moment compensating arm which is at least 300 cm long and which extends out from the crane with a horizontal component, the end of said arm being connected via a wire to a winch located remotely from the crane. By using such a moment compensating arm, the moment applied to the base portion by the lifting boom can be compensated via this moment compensating arm. In this way, the moment loads on the tower section can be reduced.

In one embodiment, the arm is pivotable about a horizontal axis. In this way, the moment provided by the wire connection to the crane can be adjusted by pivoting the arm about the horizontal axis to adjust the horizontal component of the moment compensating arms extension. In one embodiment, the horizontal component of the moment compensating arm is at least 100 cm, at least 200 cm or at least 300 cm. In one embodiment, the arm is pivotable about a vertical axis. In one embodiment, the wire connected to the arm is the lifting wire of the wire and pulley system and is connected to the main hoisting winch of the crane.

In one embodiment, the moment compensating arm is attached to the lifting boom. In one embodiment, the moment compensating arm is arranged to pivot about a vertical axis in an inverse relationship to pivot motion of the lifting boom of the crane.

In one embodiment, the length of the lifting boom is such that the vertical distance between the highest location of the lifting member and the tower flange connection elements is greater than 5 m, greater than 10 m or greater than 20 m. In one embodiment, said vertical distance is greater than the height of a tower section. In this way, the crane can be used to assemble the tower itself, but lifting subsequent tower sections on to the top of the previous tower section.

The invention also relates to an assembly comprising a wind turbine tower according to any one of the embodiments disclosed herein, a crane according to any one of the embodiments disclosed herein connected to a flange of a tower section of the wind turbine tower and a winch located near the base of the wind turbine tower, said winch comprising a wire which is connected to the wire and pulley system of the crane.

It should be noted that the features of the moment compensating arm could be the basis of a divisional application and could support other types of cranes, for example cranes which were connected to multiple points on the wind turbine tower separated by a vertical distance. In this way, a potential claim directed to this invention could be worded along the lines of a crane comprising a base portion, a tower connection portion connected to the base portion and a lifting boom displaceably connected to the base portion, said lifting boom being provided with a lifting wire and a lifting member, for example a lifting hook, for lifting a load, wherein the tower connection portion is arranged to be detachably connectable to a cooperating crane connection portion on a wind turbine tower section, and wherein the crane further comprises a moment compensating mechanism comprising a moment compensating arm which is at least 300 cm long and which extends out from the crane with a horizontal component, the end of said arm being connected via a wire to a winch located remotely from the crane. The features of the other embodiments disclosed herein could also be combined with this invention as should be obvious to the person skilled in the art.

It should also be noted that the combination of the features of the wire and pulley system as discussed above and the features of the height of the lifting boom could be combined to form the basis of a divisional application which would cover other types of cranes than the one currently claimed. An example claim could be a crane comprising a base portion, a tower connection portion connected to the base portion and a lifting boom displaceably connected to the base portion, said lifting boom being provided with a lifting wire and a lifting member, for example a lifting hook, for lifting a load, wherein the tower connection portion is arranged to be detachably connectable to a cooperating crane connection portion on a wind turbine tower section, and wherein the crane further comprises a wire and pulley system comprising the lifting wire and the lifting member and wherein the wire and pulley system further comprises a lower pulley block comprising a pulley and an upper pulley block comprising at least one more pulley than the lower pulley block, the upper pulley block comprising the lifting member and the lower pulley block comprising a first connection element suitable for establishing a detachable connection to the lifting member and a second connection element suitable for establishing a detachable connection to a crane hoisting connection element arranged on a tower section of a wind turbine tower when the crane is connected to a tower section.

It should be emphasized that the term "comprises/comprising/comprised of" when used in this specification is taken to specify the presence of stated features, integers, steps or components but does not preclude the presence or addition of one or more other features, integers, steps, components or groups thereof. For example, in the claim related to the crane, it is stated that the crane comprises two arms. This should be understood in that the crane has at least two arms, and cranes with three arms, four arms, etc would also be comprised within the scope of the claim. As another example, in one of the claims it is stated that each of the arms comprises one tower flange connection element. This should also be understood in that each of the arms comprises at least one tower flange connection element. As such a crane with an arm having two or more tower flange connection elements is also covered.

BRIEF DESCRIPTION OF THE DRAWINGS

FIGS. 1a+1b show a side view and a perspective view respectively of a first step in a tower building process using the crane and tower according to the current invention.

FIGS. 10a+10b show a side view and a perspective view respectively of a tenth step in a tower building process using the crane and tower according to the current invention.

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

FIGS. 1a to 11b show eleven steps of a method for assembling a wind turbine tower, placing the nacelle on the top of the tower and mounting the blades to the nacelle. The method used in the figures makes use of a novel type of crane and a tower section with a novel flange to enable the assembly method.

The function of the crane and the flange will be described with reference to the method steps to better illustrate the function.

In FIG. 1a+1b, a base tower section 1 has been erected on a supporting surface (not shown), in a manner which is known in the art. The base tower section is typically bolted to a foundation element (not shown) as is known in the art.

Figure 5A:
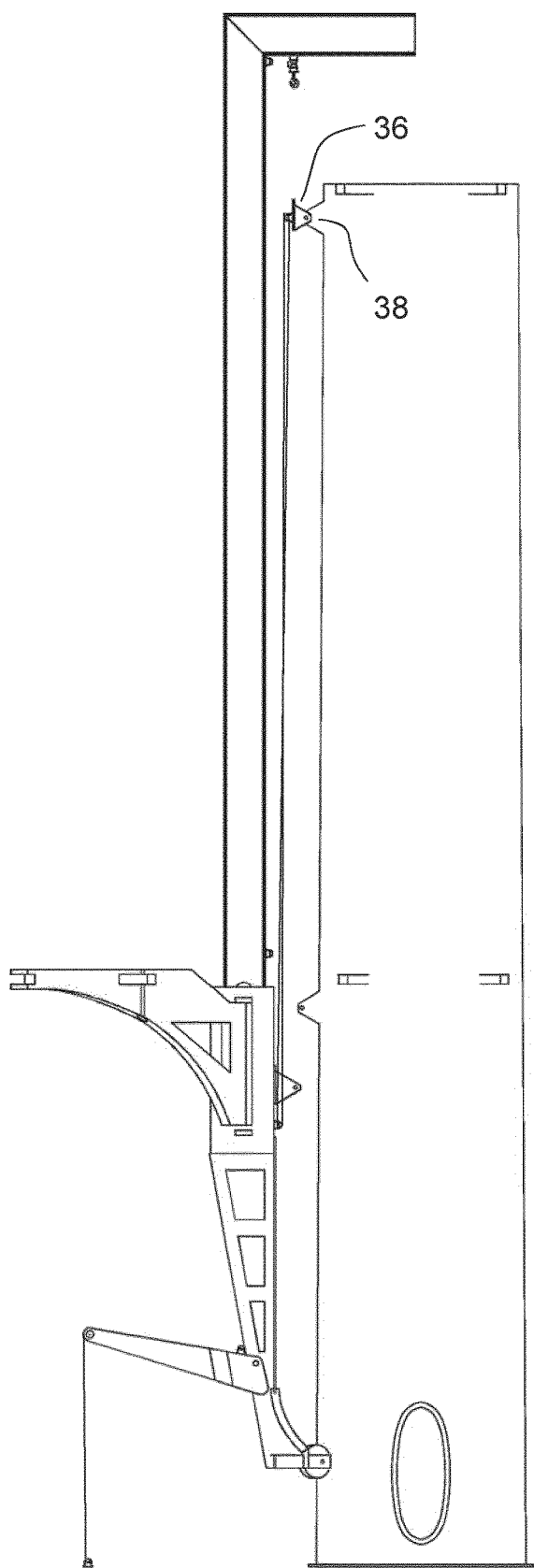
FIGS. 5a+5b show a side view and a perspective view respectively of a fifth step in a tower building process using the crane and tower according to the current invention.
Figure 5B:
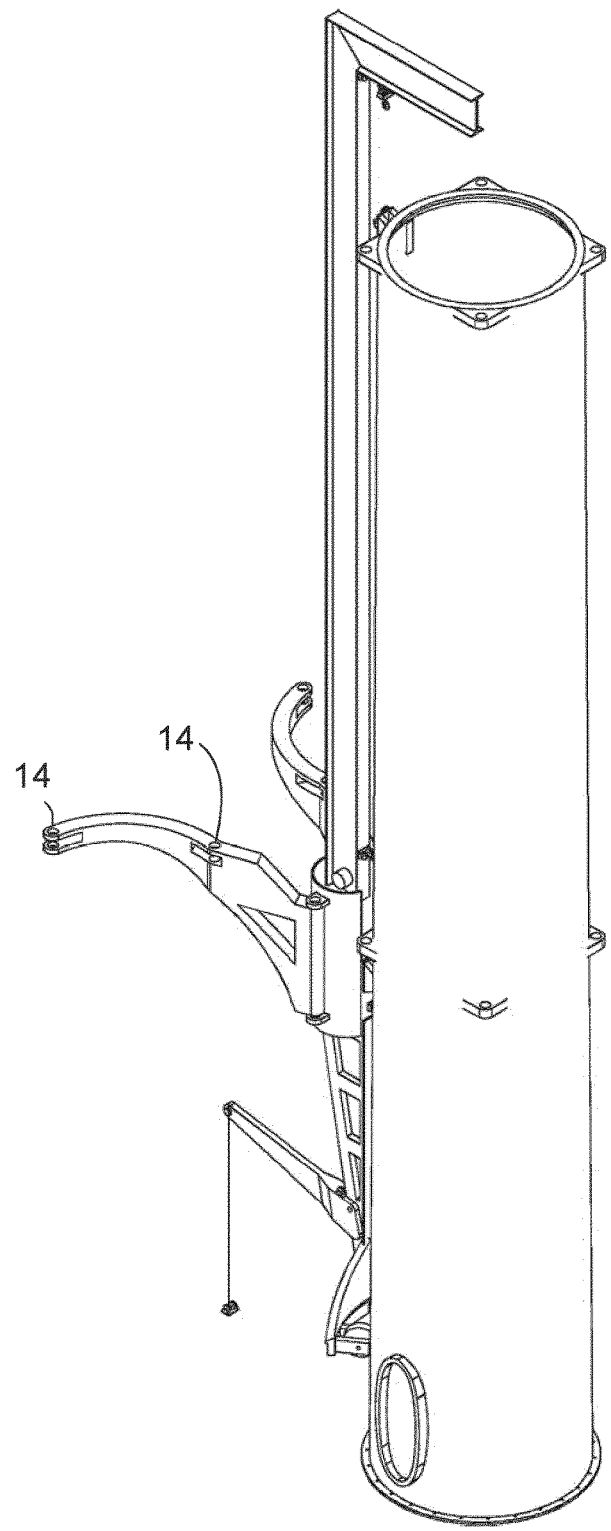

Once the base tower section is erected, a crane 2 is connected to the base tower section 1. The crane comprises a base portion 4, and two arms 6, 8 pivotably connected to the base portion. The two arms are arranged to pivot around a vertical axis so that they can be pivoted into connection with the tower section as shown in FIGS. 1a and 1b or pivoted away from the tower section as shown in FIGS. 5a and 5b.

In the current embodiment, the arms each comprise two tower flange connection elements 10 which engage with crane connection elements 12 on the tower section. In this embodiment, the crane connection elements 12 are arranged as flanges which extend outwardly from the outer surface of the tower section and the tower flange connection elements 10 are arranged as slots in the arms which engage with the tower flanges 12. A pin 13 is inserted into a hole 14 in an upper surface of the crane arms to engage with a corresponding hole 16 in the crane connection element flanges 12 on the tower section. It should be noted that this is one embodiment of a crane connection element and a tower flange connection element and it is shown rather schematically. It should be clear to the person skilled in the art, that the crane connection elements on the tower section and the tower connection elements on the crane can be formed in many different ways. Furthermore, automatic solutions with hydraulic or electrically operated locking mechanisms could be imagined.

In this embodiment, the base tower section 1 has two sets of crane connection elements 12. A first set located near the middle 18 of the base tower section and a second set located at the upper end 20 of the base tower section. In the first step, the crane is attached to the first set of crane connection elements so that the crane does not have to be lifted so high. The crane can be transported to the site via a truck and then lifted into place via a separate crane, or by lifting itself from the truck. This process is not illustrated as the person skilled in the art could provide a suitable way of getting the crane from the truck to the lower most crane connection elements.

The crane connection elements 12 shown in the figures, are arranged as steel flanges which extend outwardly from the outer surface of the tower section. In the case where the flanges are arranged at the upper portion of the tower section, the flanges can be an integrated part of the bolt flange which is used to bolt two tower sections together. Such bolt flanges are integrated into the end of the tower sections already and the crane connection flanges can be provided by extending the bolt flange outwardly past the outer surface of the tower section.

The base portion 4 and arms 6,8 of the crane are arranged such that when the arms are both connected to the crane connection elements 12 of the tower section 1, then the base portion can absorb a large moment about the crane connection elements in a safe manner and without undesired deflection. Hence, the entire load of the crane can be supported by that arms and the base portion. The term "large moment" should be related to the crane size and the maximum amount that the crane is designed to lift. Larger cranes which can lift larger tower sections will have to have stronger arms and stronger crane connection elements need to be provided on the tower sections. Smaller cranes which lift smaller tower sections can be made with less strong arms and less strong crane connection elements can be provided on the tower sections. The person skilled in the art will be able to determine the necessary strengths and sizes to ensure a safe operation of this crane type.

The crane further comprises a lifting boom 22 connected to the base portion 4. The lifting boom is arranged to be able to tilt about a horizontal axis at the connection to the base portion and also pivot about a vertical axis passing through the base portion. The details of the crane tilt and pivot mechanism are not shown in detail. In general, the details of the crane are shown schematically to illustrate the novel concepts of the invention. However, suitable lifting booms are known in the art which could be used in this application. The actual implementation could be different than that shown in the figures. The person skilled in the art can however provide the details necessary to implement the solution based on his or her common general knowledge of lifting booms.

The crane also comprises a wire and pulley system comprising a lifting wire and a number of pulleys. The wire and pulley system has two purposes. The first purpose is to act as a lifting wire to lift loads with the crane via the lifting hook 30. The second purpose is to lift the crane itself so that it can move up and down the tower. The wire and pulley system will be described in more detail with regards to the schematic FIGS. 15a and 15b. In the FIGS. 1a-11b, the details of the wire and pulley system are not shown in detail as they would just complicate the figures. However, in some of the FIGS. 1a-11b, a thick grey line is provided to schematically illustrate how the main wire 32 of the wire and pulley system could be routed. The wire is shown overly simplified to illustrate the concept. In a real world system, additional details will be provided to ensure safety, strength and function. The person skilled in the art will understand the concept of the current invention and together with the more schematic illustrations in FIGS. 15a and 15b, be able to provide a wire and pulley system which fulfils the demands for a real world system.

The main lifting wire is controlled via a winch 34 located on the ground, close to the base of the tower. The winch has not been shown, but its location is shown with the reference numeral 34. Hence, the crane itself does not have to comprise a lifting winch and does not have to be provided with power to lift the crane or the tower sections. The entire operation and power supply can remain on the ground. The power supply and the winch can therefore also function as a part of the counterweight for the lifting operations. Instead of having to lift a counterweight to the top of the crane, the counterweight can remain on the ground.

Figure 2A:
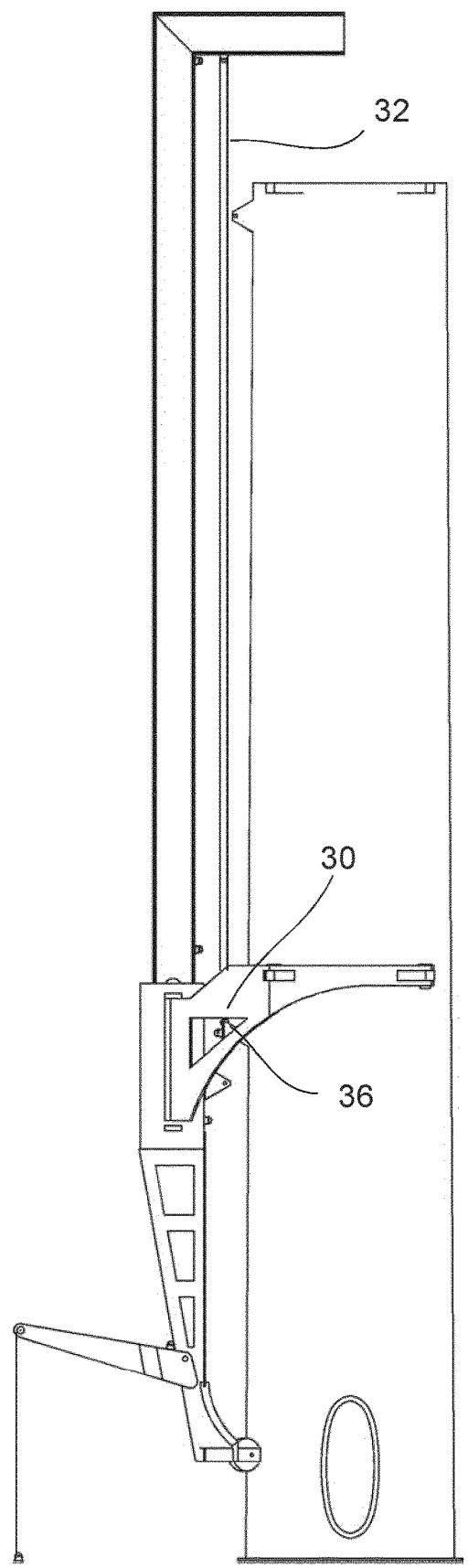
FIGS. 2a+2b show a side view and a perspective view respectively of a second step in a tower building process using the crane and tower according to the current invention.

FIGS. 2a+2b show a second step in the assembly procedure. In this step, the main lifting wire 32 has been slacked out so that the lifting hook 30 (hidden by the arm) is lowered until it comes into contact with a crane lifting block 36 (also hidden by the arm). The crane lifting block is attached to the tower section near the crane connection elements via a crane hoisting connection element 38. This is partially hidden in FIG. 2a by one of the arms. The lifting hook is connected to the crane lifting block and then the crane lifting block is detached from the crane hoisting connection element.

Figure 3A:
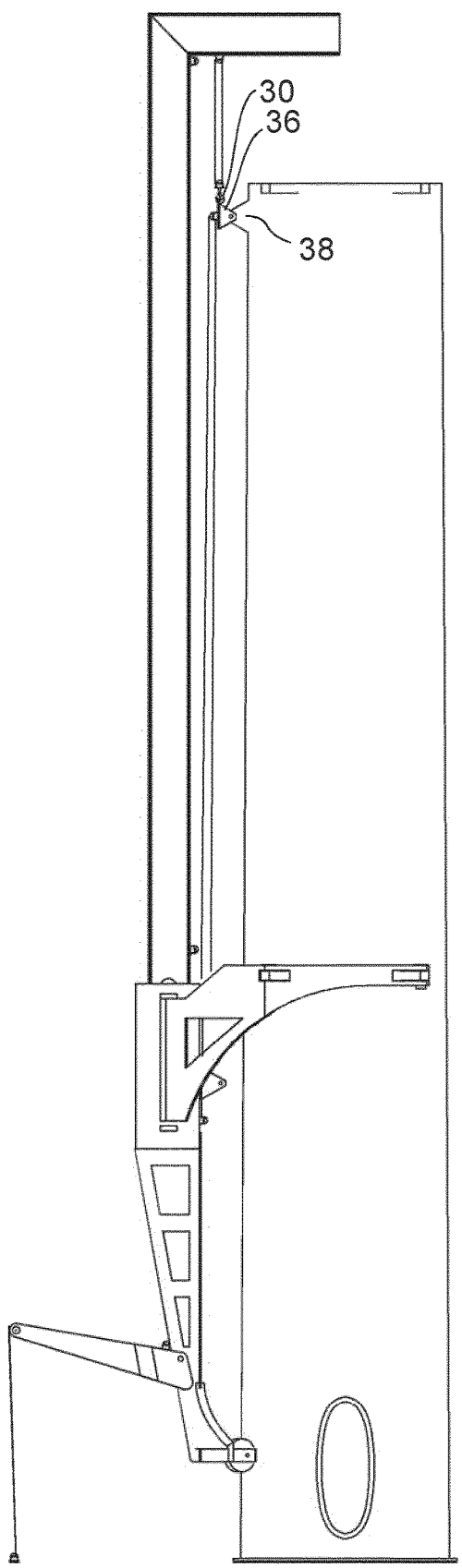
FIGS. 3a+3b show a side view and a perspective view respectively of a third step in a tower building process using the crane and tower according to the current invention.
Figure 3B:
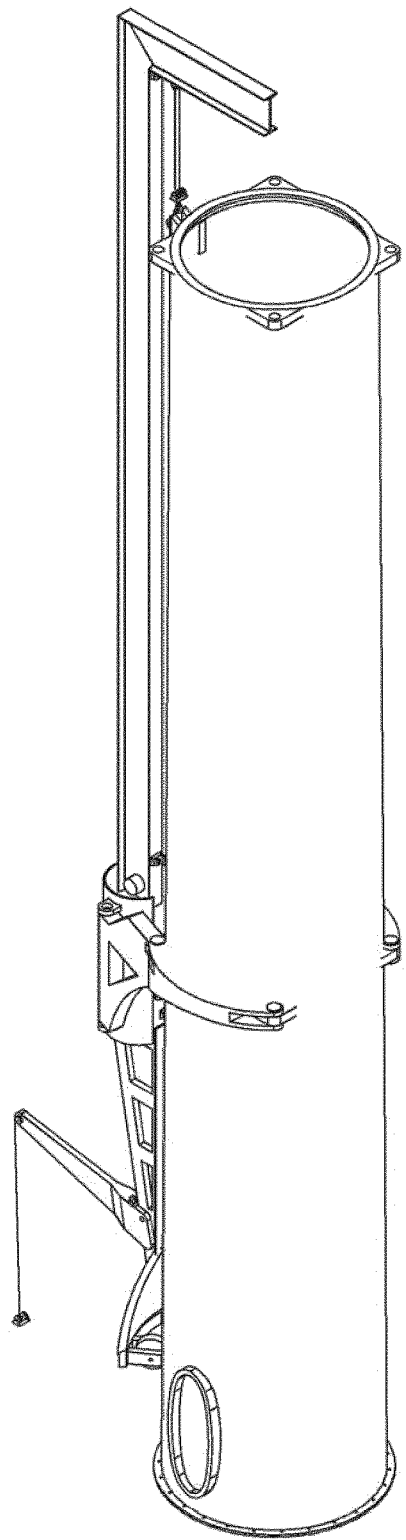

The wire is then tightened up as shown in FIGS. 3a and 3b. As the wire is tightened up the crane lifting block 36 will be raised until it is at the same height as a crane hoisting connection element 38 located near the top of the tower section. The crane lifting block 36 is then connected to the crane hoisting connection element at the top of the tower section.

Figure 4A:
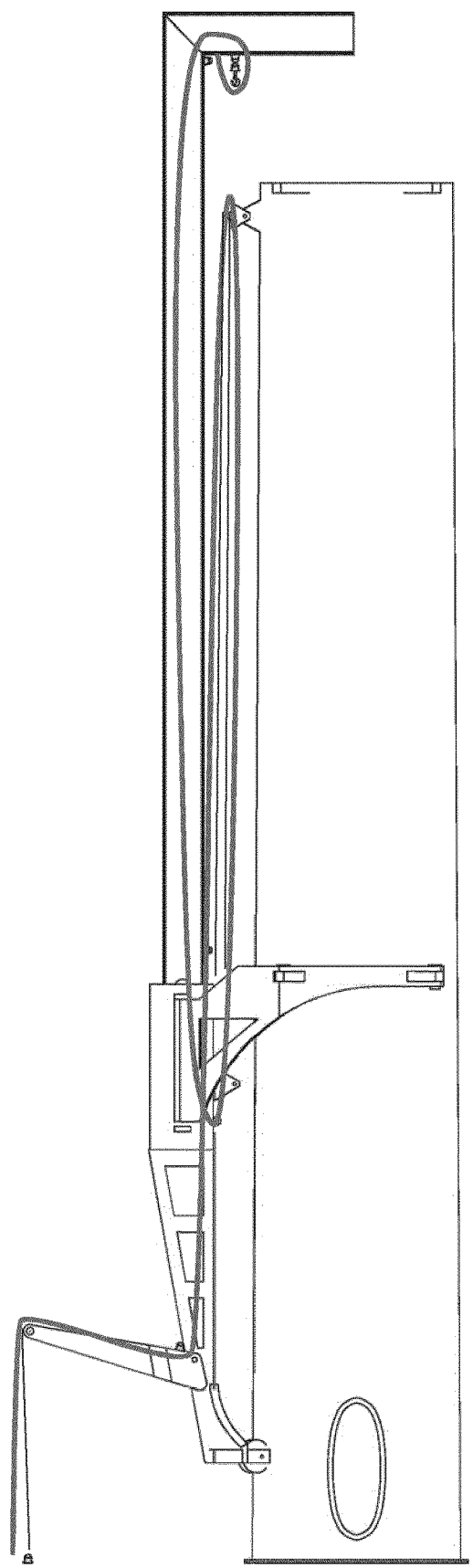
FIGS. 4a+4b show a side view and a perspective view respectively of a fourth step in a tower building process using the crane and tower according to the current invention.
Figure 4B:
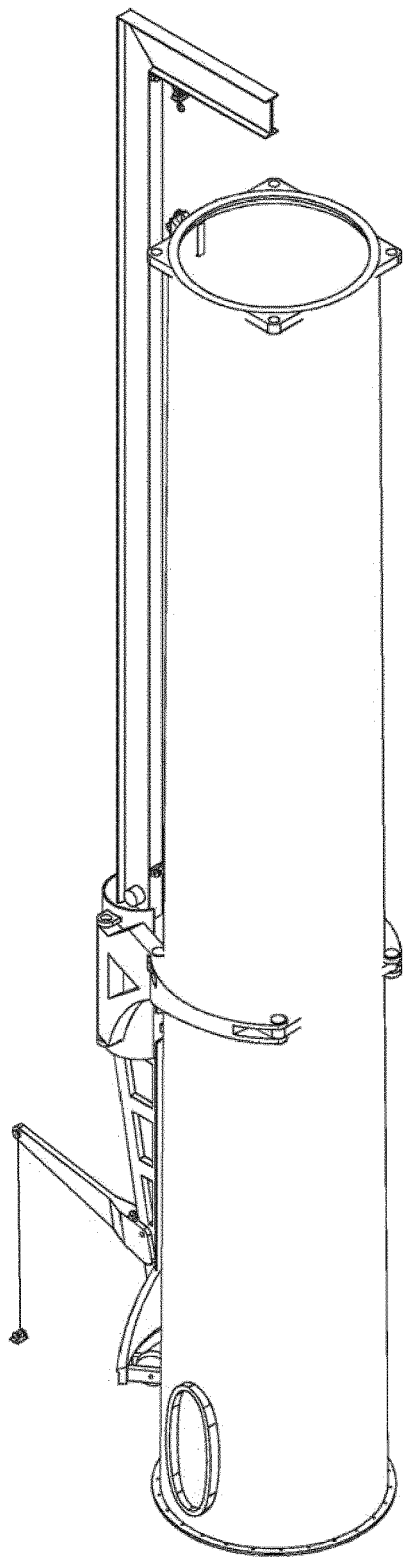

The lifting hook is then detached from the crane lifting block 36 and the wire is further tightened to move the lifting hook all the way to the top of the lifting boom. This is shown in FIGS. 4a and 4b.

Once the wire is all tightened, then the arms are folded out to release the crane connection elements on the tower section. This is shown in FIGS. 5a and 5b. The crane is now hanging from the crane lifting block 36 attached to the tower section via the crane hoisting connection element 38.

Figure 6A:
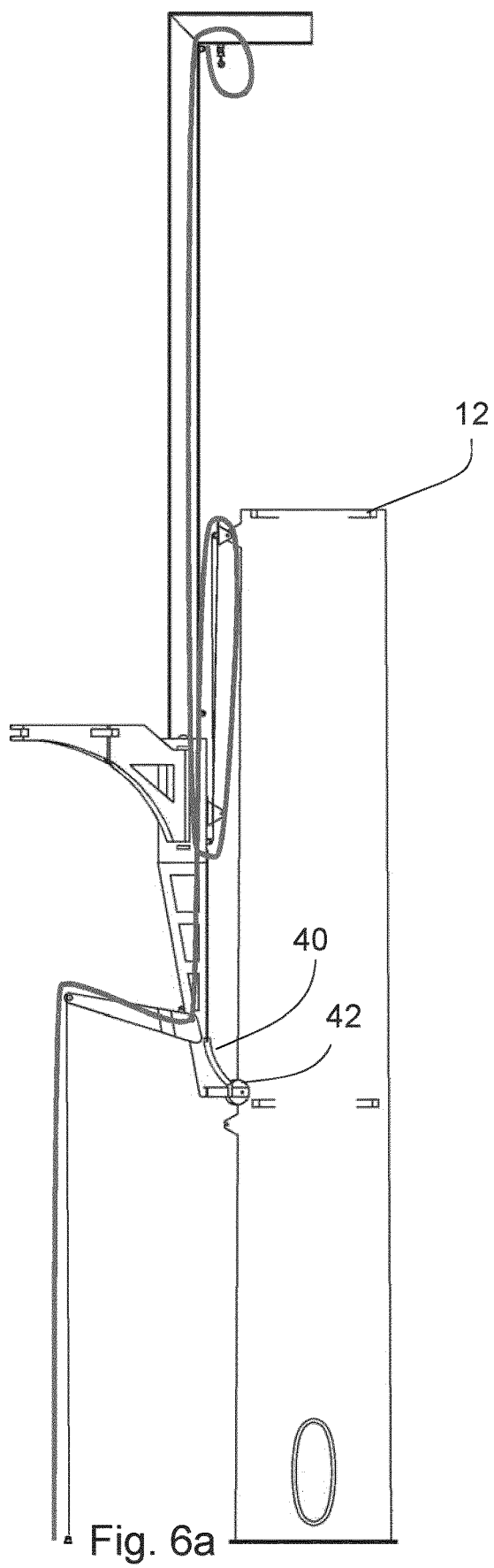
FIGS. 6a+6b show a side view and a perspective view respectively of a sixth step in a tower building process using the crane and tower according to the current invention.
Figure 6B:
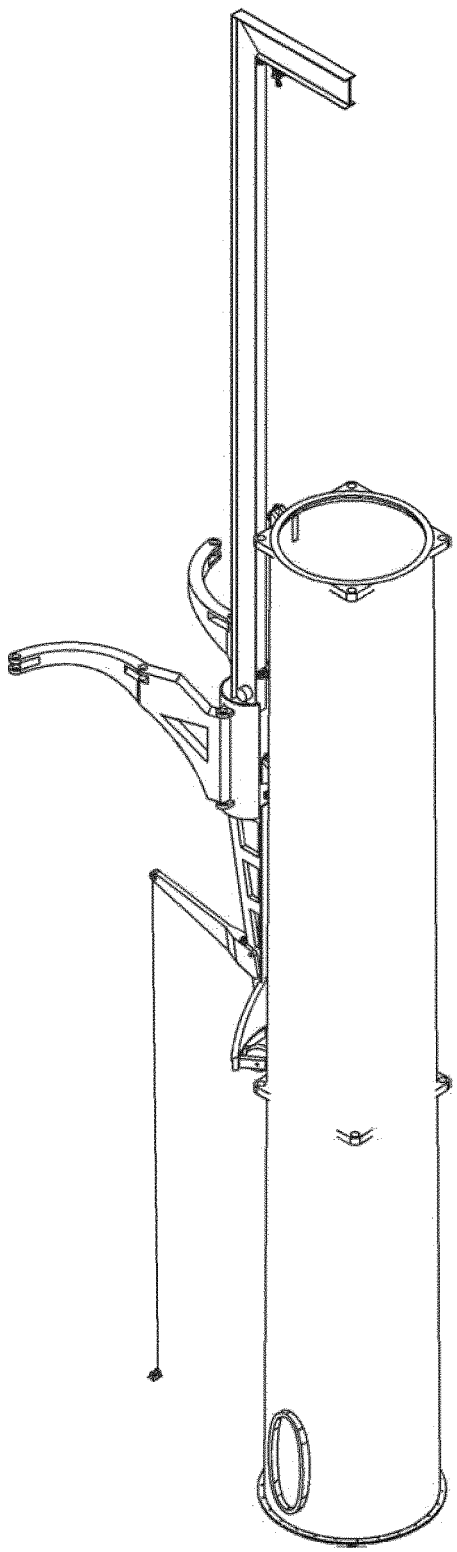

The wire is then tightened even further as shown in FIGS. 6a and 6b to lift the crane up the tower. In order to prevent damage to the tower as the crane moves up the tower, a lower support arm 40 is provided on the crane with rollers 42 which engage with the tower surface allowing the crane to roll up the side of the tower section.

Figure 7A:
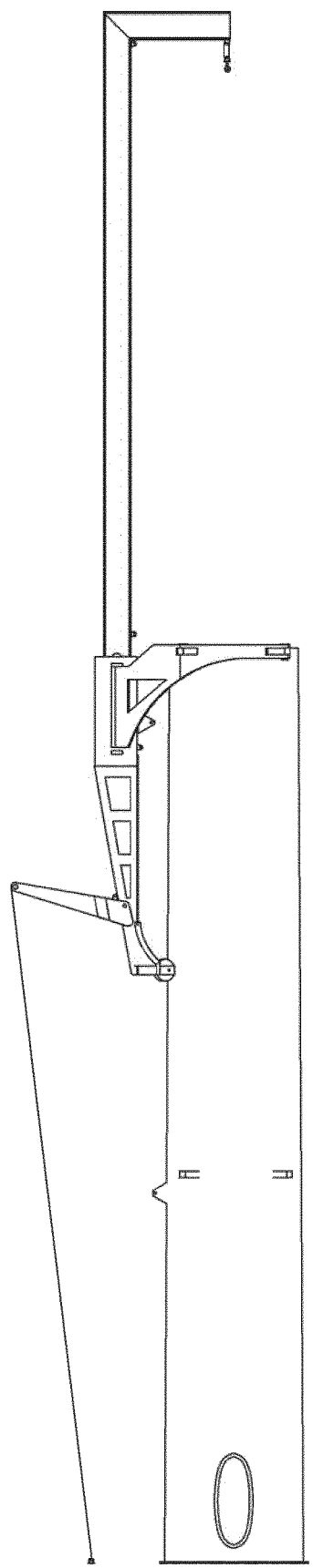
FIGS. 7a+7b show a side view and a perspective view respectively of a seventh step in a tower building process using the crane and tower according to the current invention.
Figure 7B:
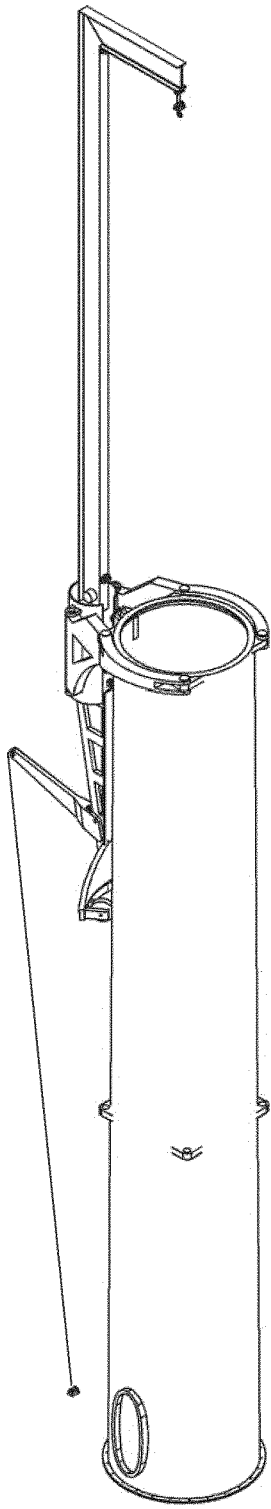

When the crane arrives at the upper portion of the tower, and the arms are at the same level as the crane connection elements 12 at the upper end of the tower, then the arms are pivoted in again and the tower flange connection elements of the arms engage with the crane connection elements of the tower section. This is shown in FIGS. 7a and 7b. The crane has now been moved to the top of the tower section and is again firmly connected to the tower section via the crane connection elements 12. The crane is now ready to lift the next tower section into place.

Figure 8A:
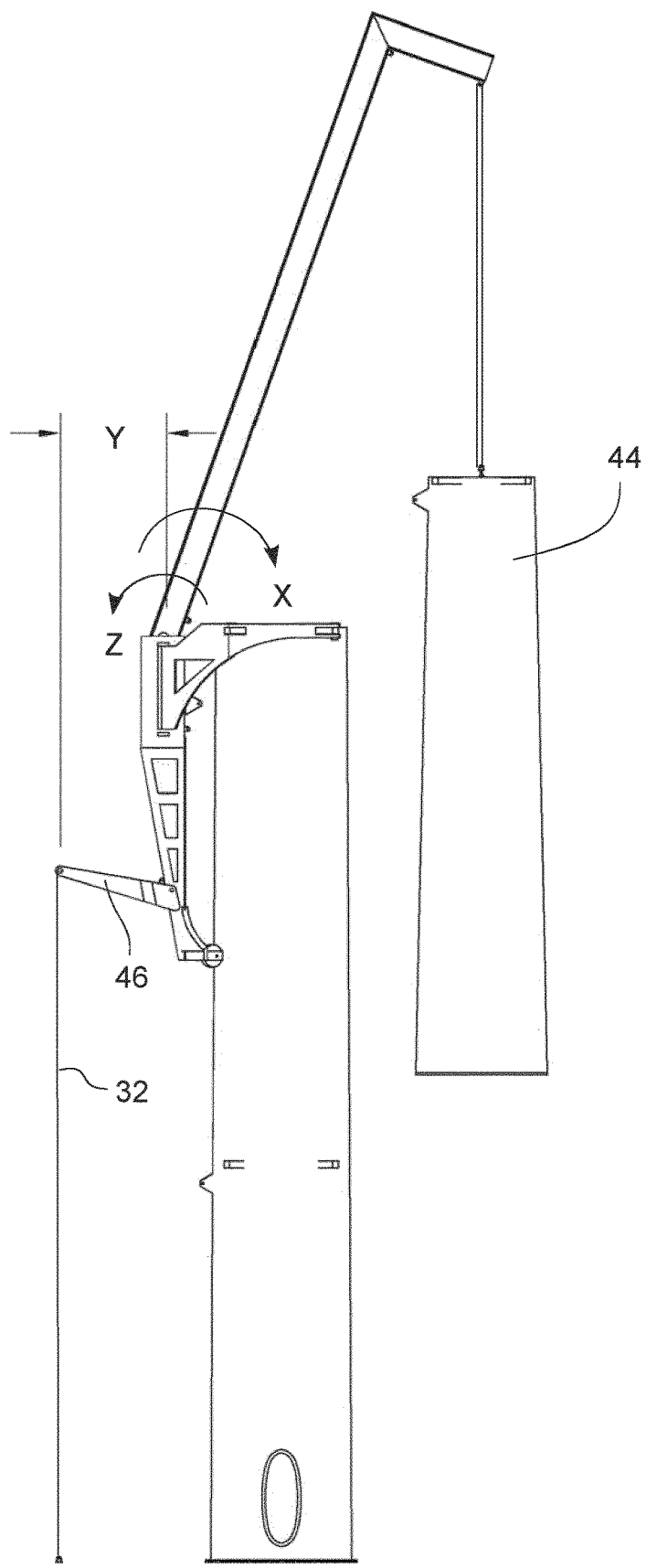
FIGS. 8a+8b show a side view and a perspective view respectively of an eighth step in a tower building process using the crane and tower according to the current invention.
Figure 8B:
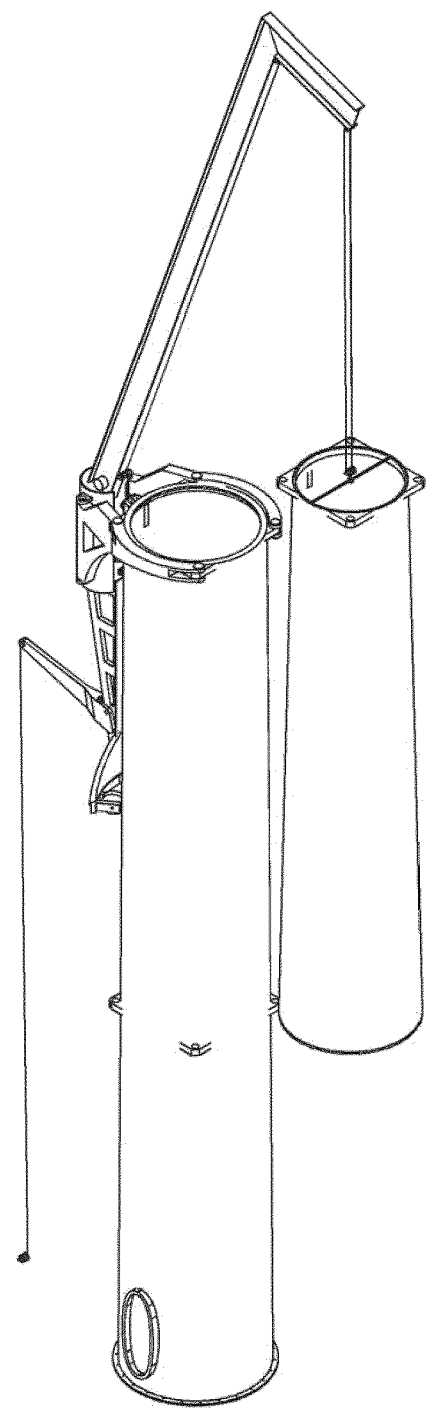

FIGS. 8a and 8b show how the cranes lifting boom has been tilted about a horizontal axis to extend over the base tower section so that it is in position to lift the next tower section 44 into place. In this case, as is evident from FIG. 8a, the next tower section exerts a relatively high load on the lifting boom of the crane. This generates a large moment on the base portion of the crane and is illustrated by the arrow X in the figure. This moment is absorbed by the arms of the crane and transferred to the tower flange via the crane connection elements 12 on the tower section.

Furthermore, as illustrated in FIG. 8a, the crane in this embodiment also comprises an extra moment compensating arm 46 extending from the base portion of the crane. The main lifting wire 32 is passed over this arm and due to the distance Y between the wire attachment point and the base portion of the crane, the wire itself together with the arm will generate a counter moment Z which helps to balance the moment X about the base portion of the crane. In this way, the actual moment transferred to the tower flange can be reduced.

The moment compensating arm 46 can furthermore be rotated about a horizontal axis such that the horizontal distance Y between the base portion and the wire attachment portion of the arm can be adjusted. In this way, the moment provided by the moment compensating arm can also be adjusted, even though it is not possible to adjust the actual tension in the lifting wire 32.

As will be described in more detail later on with respect to FIGS. 12a-13b, the arm can also be rotated about a vertical axis to adjust the direction of the moment compensation. This is relevant when the crane lifting boom also rotates about a vertical axis as will be shown in relation to FIGS. 12a-13b.

Figure 9A:
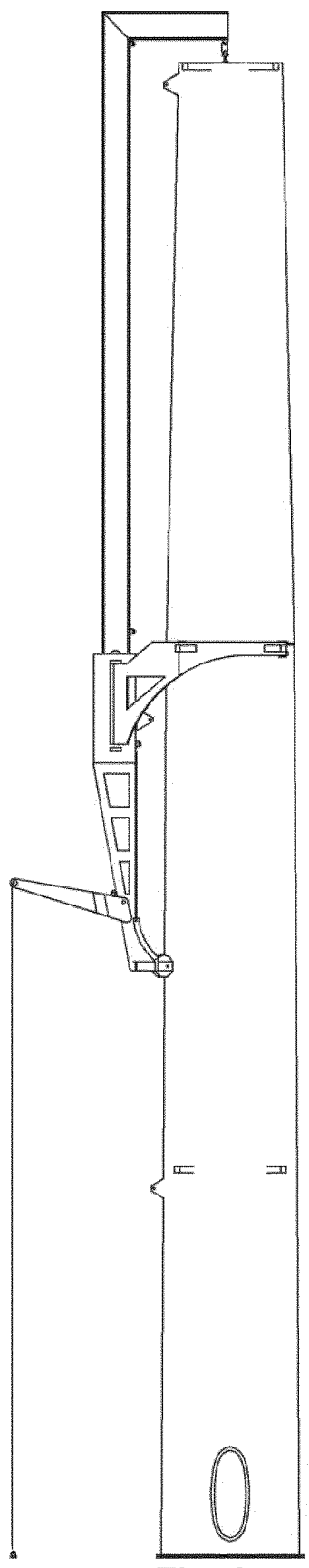
FIGS. 9a+9b show a side view and a perspective view respectively of a ninth step in a tower building process using the crane and tower according to the current invention.
Figure 9B:
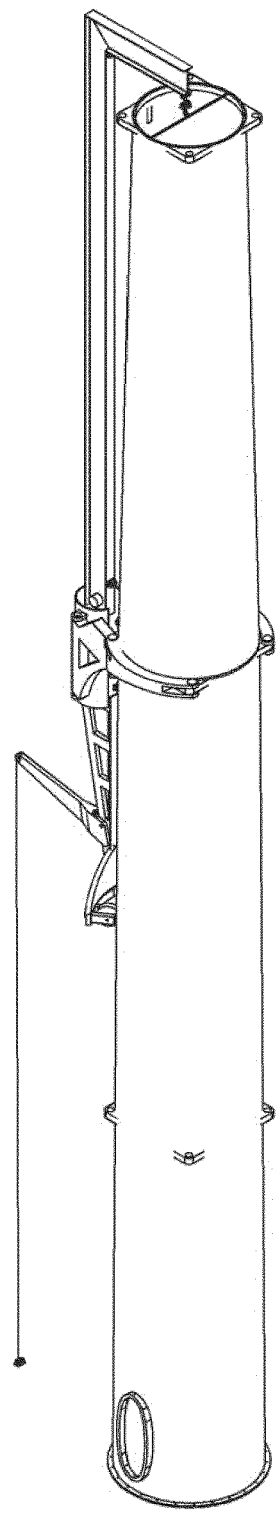

FIGS. 9a and 9b show how the upper tower section has been installed on top of the base tower section. Once the upper tower section is in place, then the upper tower section and base tower section can be bolted together as is known in the art. This is not described in more detail here.

Figure 2B:
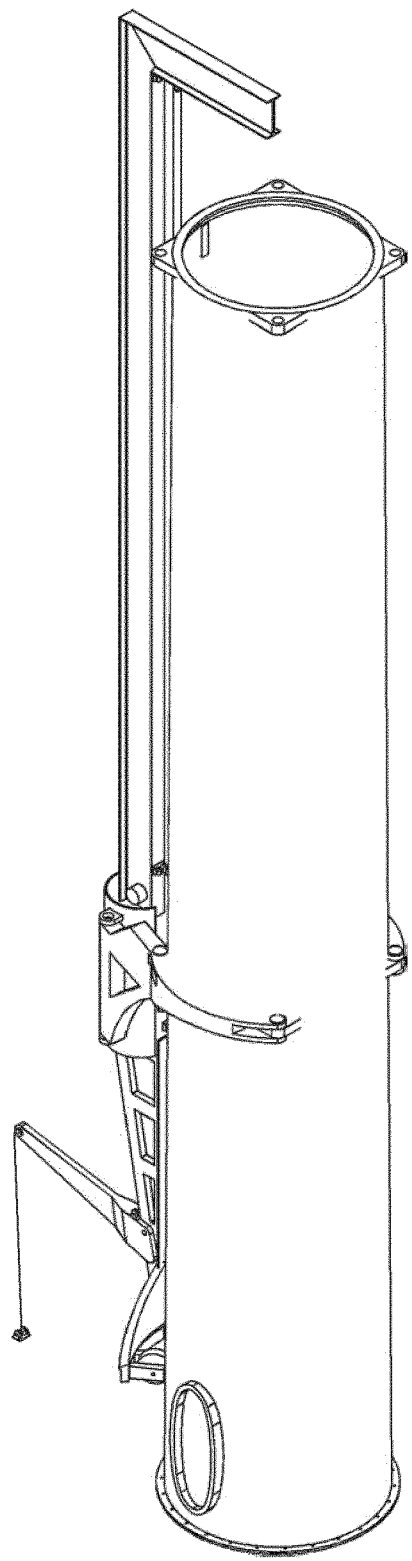

Once the upper tower section is bolted into place, then the crane can release the upper tower section and restart the crane lifting procedure as illustrated in FIGS. 2a and 2b. The process can be repeated until the entire tower is built.

Once the entire tower is built and the crane is installed on the uppermost tower section 48, the crane can then lift the nacelle 50 into place, as shown in FIGS. 10a and 10b. Likewise, after the nacelle is in place, then the crane can lift the blades 52 into place as shown in FIGS. 11a and 11b.

Figures 11A, 11B:
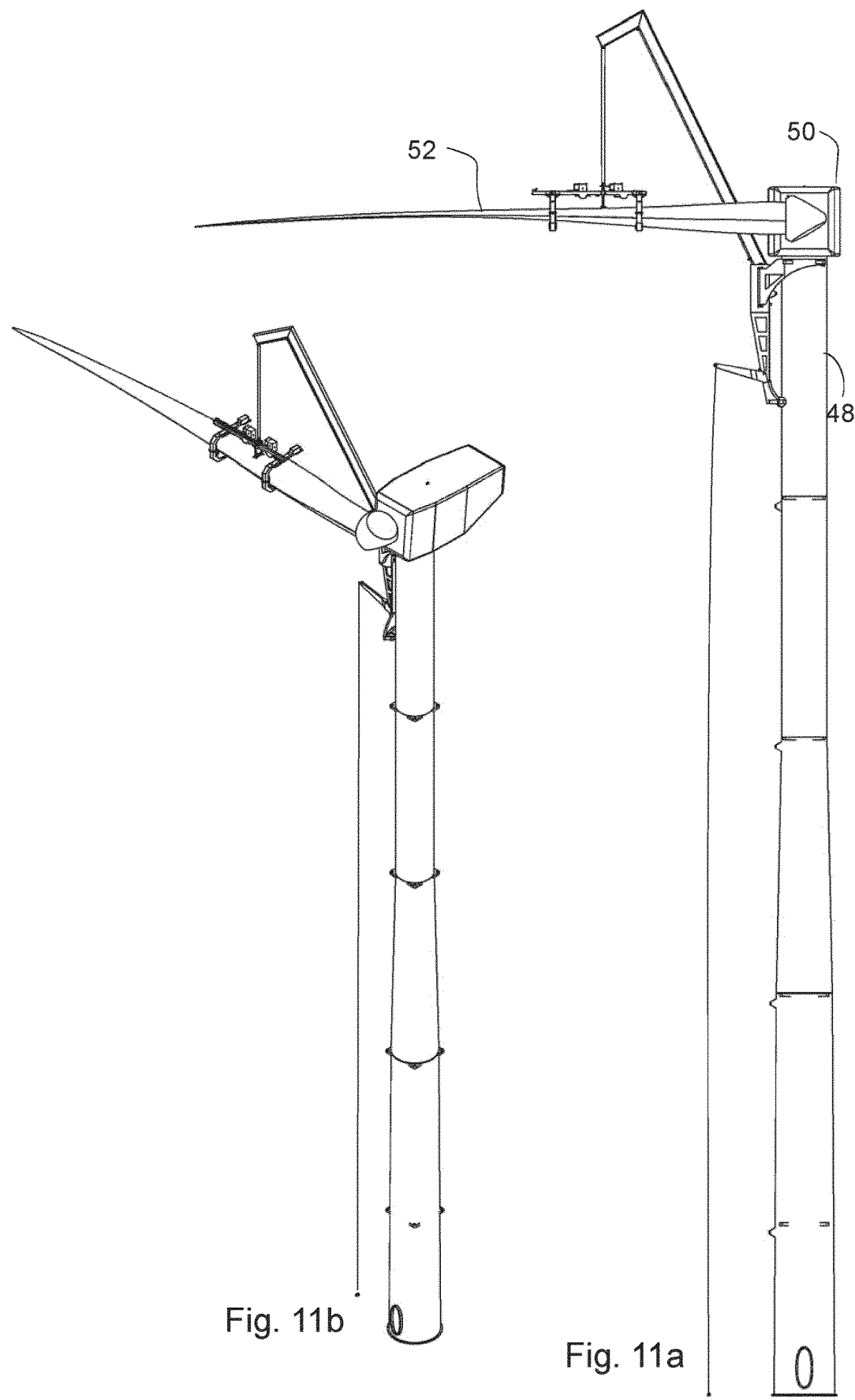
FIGS. 11a+11b show a front view and a front perspective view respectively of an eleventh step in a tower building process using the crane and tower according to the current invention.
Figures 12A, 12B:
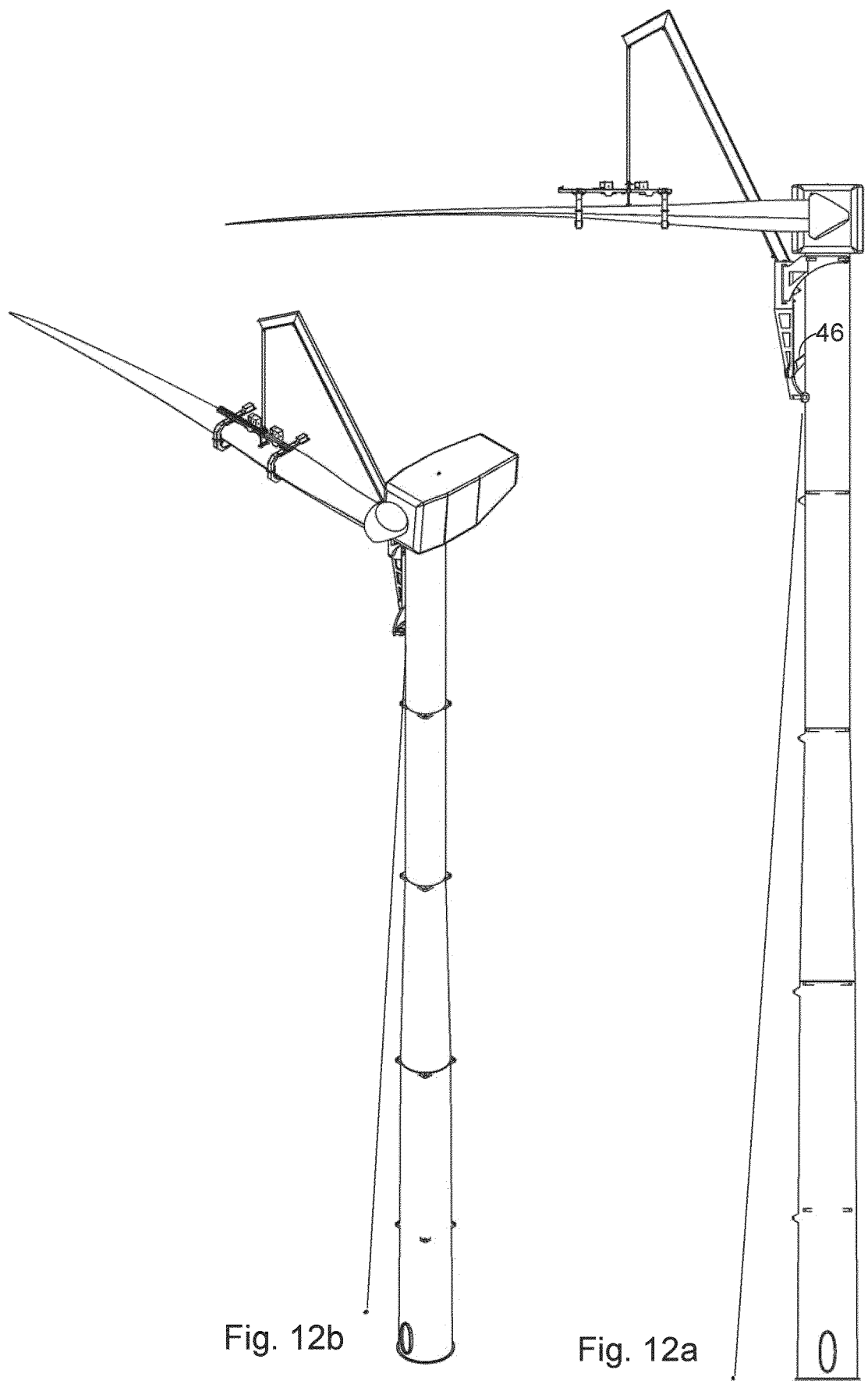
FIGS. 12a+12b show a front view and a front perspective view respectively of an alternative eleventh step in a tower building process using the crane and tower according to the current invention.
Figure 13A:
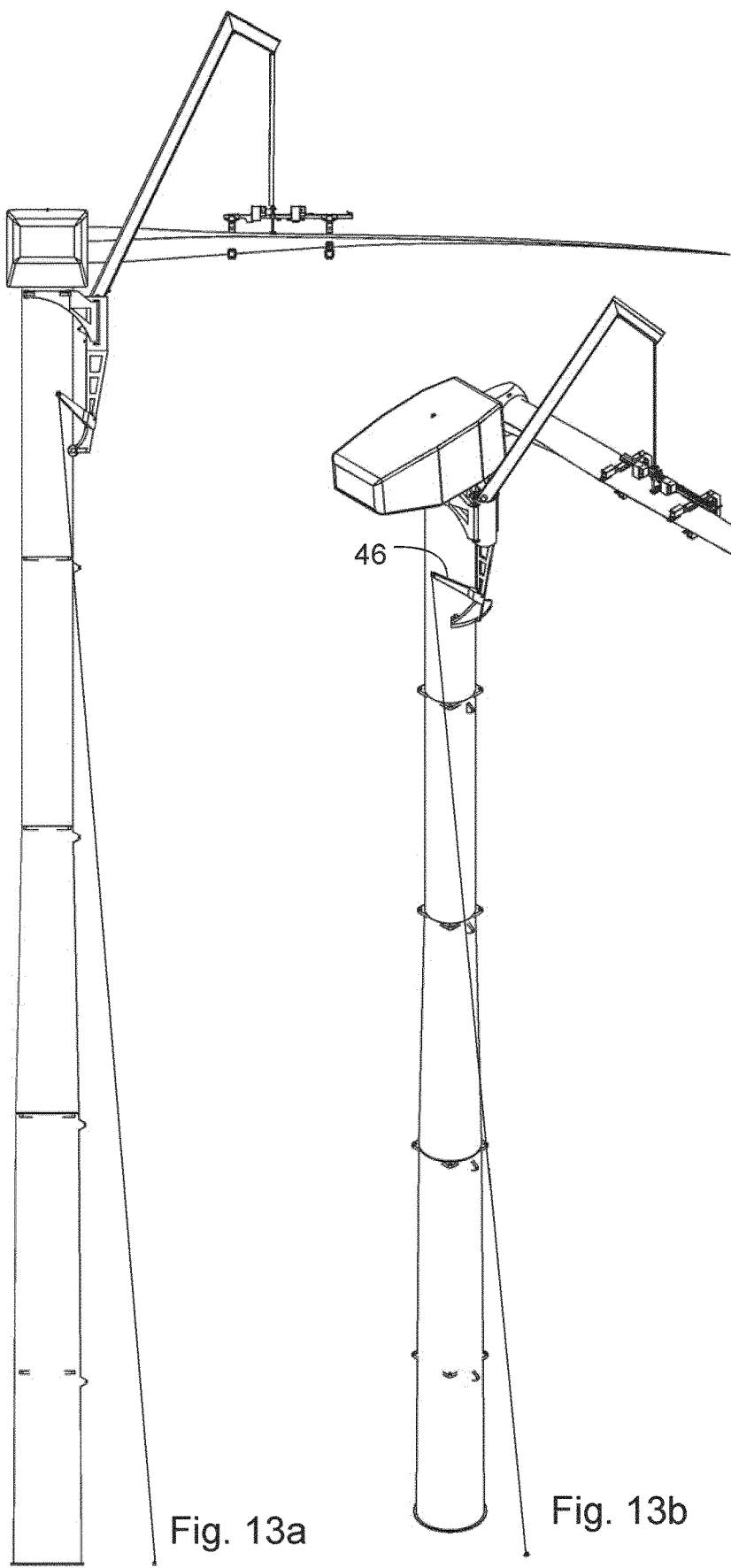
FIGS. 13a+13b show a rear view and a rear perspective view respectively of the alternative eleventh step shown in FIGS. 12a+12b.
Figure 13B:
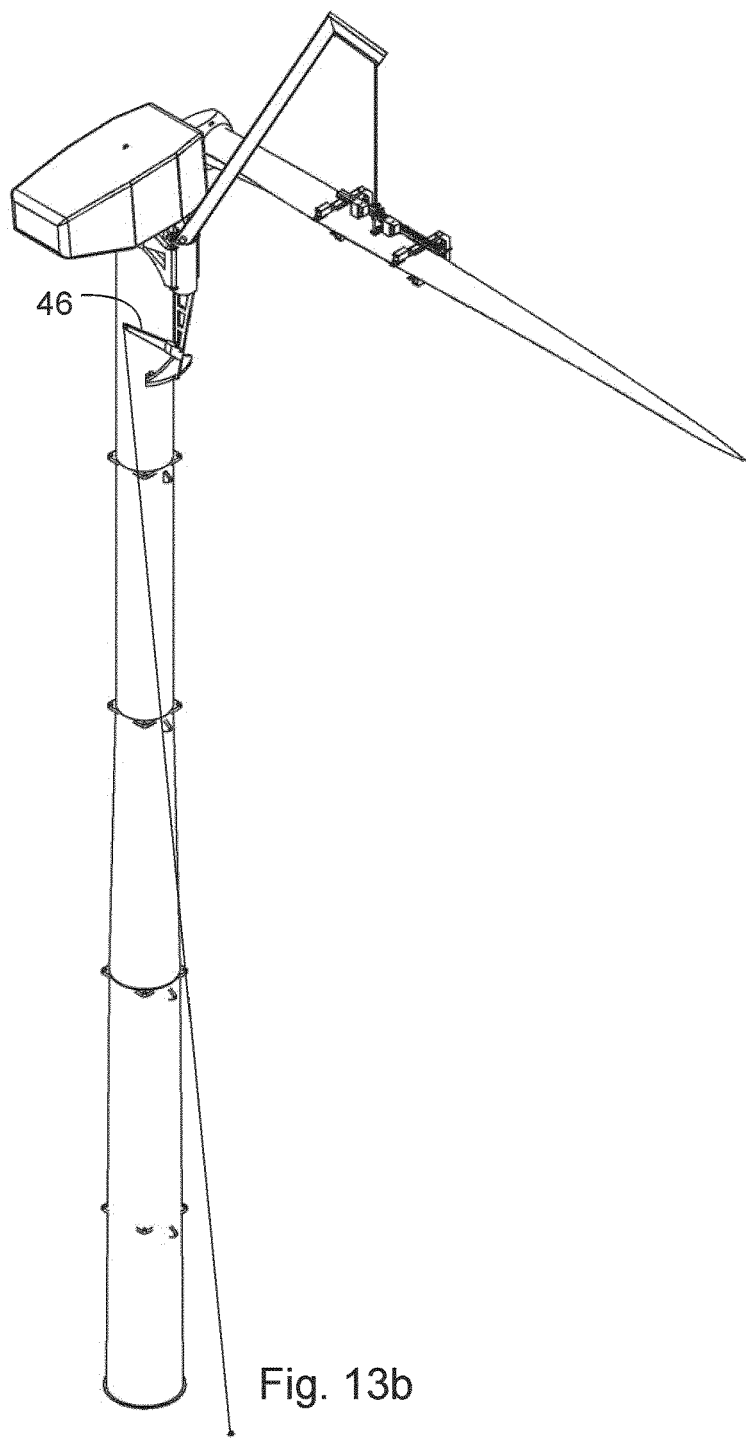

Once the blades are in place, then the crane can lower itself down by performing the procedure described in FIGS. 11a-11b in reverse.

Should an existing wind turbine need to be repaired, then a similar procedure could be used to hoist the crane to the top of the wind turbine tower after which it can be used to exchange blades, turbines, generators, drives, etc. . . .

FIGS. 12a to 13b show additional details of how the moment compensation arm 46 can be rotated about a vertical axis to better compensate for the moments during the lifting operation. When comparing FIGS. 11a and 12a, it can be seen that in FIG. 11a the load from the blade, is arranged on the left side of the tower. The moment compensating arm 46 is also located on the left side of the tower. The moment compensating arm 46 therefore increases the moment applied to the tower flange. However, in FIGS. 12a and 13a, the moment compensating arm has been rotated about the vertical axis so that it extends to the right of the tower. In this way, the moments are better balanced.

In another embodiment (not shown), the moment arm could be in a fixed position relative to the lifting boom of the crane. As the lifting boom rotates, the moment arm would also rotate the same amount. In this way, the moments would always be balanced without requiring additional control of the position of the moment arm. This arrangement would also ensure that the wires would have less chance to tangle or wrap around each other.

Figure 14A:
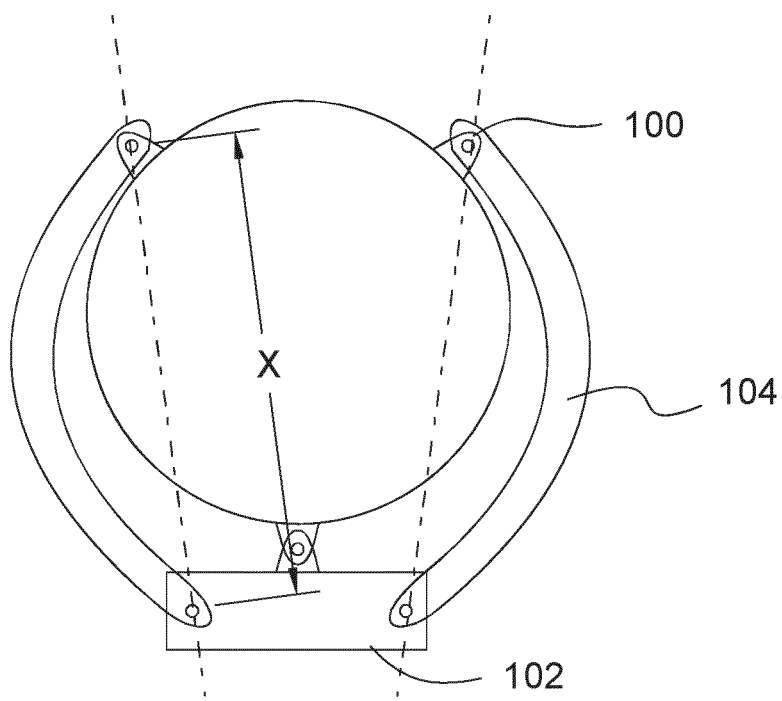
FIGS. 14a and 14b show a schematic representation of an alternative mounting flange arrangement located at an upper and lower section respectively of the tower.
Figure 14B:
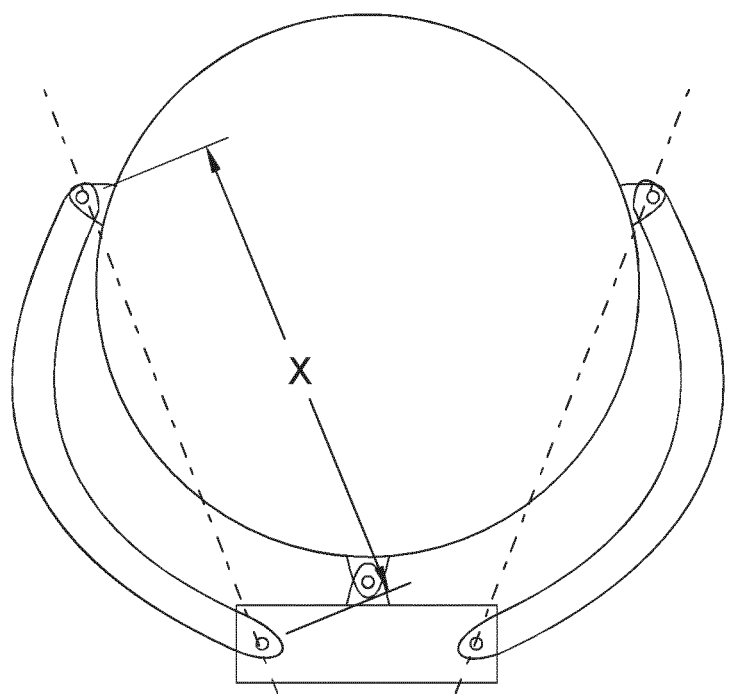

FIGS. 14a and 14b illustrate another schematic illustration of a crane attachment mechanism. In this case, instead of four connection elements, only three connection elements 100 are provided on the tower section and on the crane. The base portion 102 itself connects to one of the connection elements on the tower section and then each arm 104 connects to an additional connection element 100. This illustration has been provided very schematically to illustrate a solution with only three points. It is maintained that the person skilled in the art will be able to implement this in a real life situation without undue burden.

FIGS. 14a and 14b also schematically illustrate another option for the arrangement of the crane connection elements on the tower sections. Since towers taper from the bottom to the top, as the crane moves up the tower, the diameter of the tower sections will get smaller. In FIG. 14b, the diameter is larger than in FIG. 14a. This illustrates the difference between a lower section (14b) and a higher section (14a). However, even though the locations of the crane connection elements on the circumference change as the crane moves up the tower, crane connection elements are arranged such that the distance between the elements and the position of the elements on the tower section are adjusted so that the arms of the crane can clamp onto different flanges without having an excess of tower flange connection elements. In the figure, it can be seen that the length X of the arm between the pivot point and the connection element does not change. However, the diameter of the tower section, and the angle between the crane connection elements changes as can be seen by comparing the angle between the dashed lines in the figures.

In this way, the same tower connection elements of the arms of the crane can be used all the way up the crane.

Figure 15A:
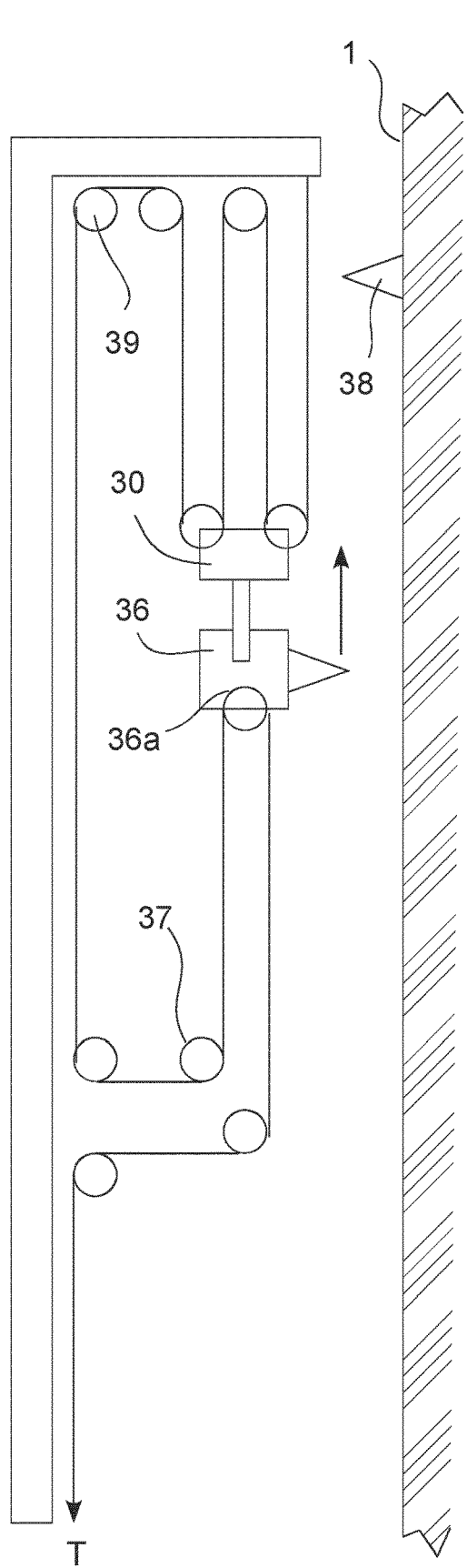
FIGS. 15a and 15b schematically show two positions of the wire and pulley system.
Figure 15B:
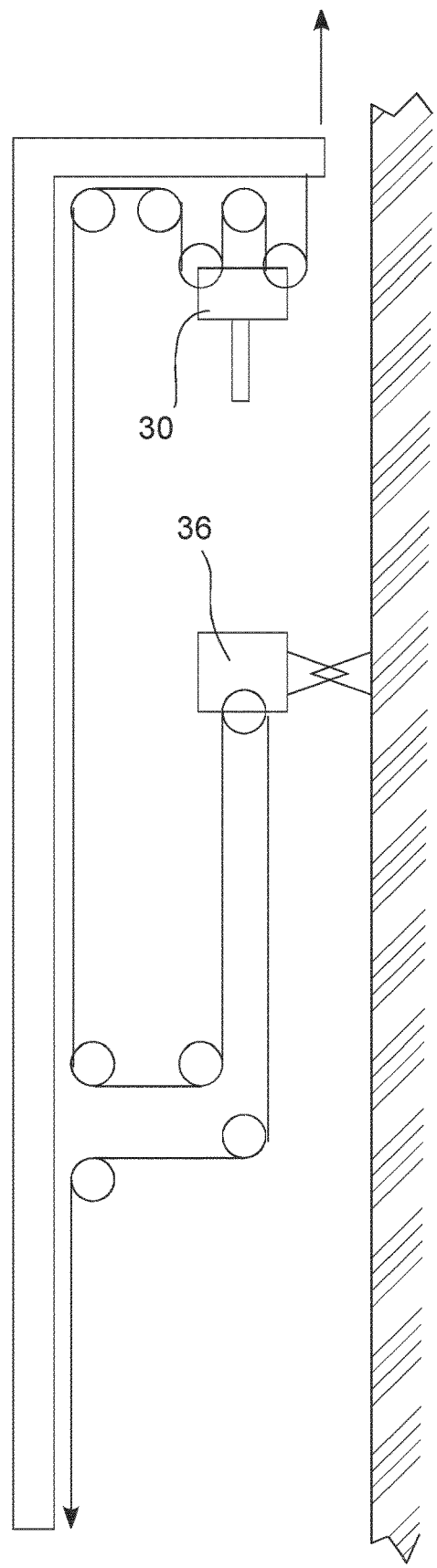

FIGS. 15a and 15b schematically illustrate the wire and pulley system used in the crane. FIG. 15a is roughly equivalent to a position between FIGS. 2a and 3a where the crane lifting block 36 has been lifted half of the way to the top and FIG. 15b is roughly equivalent to FIG. 6a/6b.

The figures show a portion of a tower section 1 to the right of the figures. A crane hoisting connection element 38 is also shown attached to the tower section 1. The wire and pulley system of the crane comprises a crane lifting block (lower pulley block) 36 and a lifting block (upper pulley block) 30. The lifting block 30 has in this embodiment two pulleys and the crane lifting block 36 only has one pulley. In this way, when the two pulley blocks are connected together and tension is applied to the wire, then the two blocks will move upwardly. When the connection between the blocks is broken, then as tension is applied to the wire, the lifting block 30 will move upwardly and the crane lifting block 36 will move downwardly. In FIG. 15b, the crane lifting block is attached to the tower and therefore, the crane lifting block is fixed in position with respect to the tower. As such, as tension is applied to the wire, the crane will be lifted up. Due to this wire and pulley system, a single wire 32 from the base of the tower can control the entire operation of the crane. This covers both the lifting of the crane itself and the loads lifted by the crane when installed.

As can be seen from the figure, the lifting wire 32 is pulled at the lower end of the figure by a tension T provided by a winch which in the current embodiment is located on the ground. The lifting wire runs up to the pulley 36a on the lower pulley block 36, then down to a lower pulley 37, then up to an upper pulley 39 and then back down to the pulleys 30a and 30b on the upper pulley block 30 before ending at the lifting boom. This is a very simplified arrangement to illustrate the operating principle. In the real world, additional pulleys and wires will be provided as will be known to the person skilled in the art.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used, the specific actuators used and the specific construction of the crane itself have not been described in detail since it is maintained that the person skilled in the art would be able to find suitable materials and suitable processes to manufacture the systems according to the current invention.

The invention claimed is:

1. A crane comprising a base portion, two arms displaceably connected to the base portion and a lifting boom displaceably connected to the base portion, said lifting boom being provided with a lifting wire and a lifting member, for lifting a load, wherein
   a. the two arms and the base portion in combination comprise at least three tower flange connection elements arranged to be detachably connectable to cooperating crane connection elements on a flange of a wind turbine tower section,
   b. each arm comprises one of the tower flange connection elements, and
   c. a vertical distance between any two tower flange connection elements in the normal operating position of the crane is less than 1 m, wherein
   each of the two arms comprise two of the at least three tower flange connection elements, and
   the tower flange connection elements of the two arms are arranged on essentially the same horizontal plane.

2. The crane according to claim 1, wherein the vertical distance between any three of the at least three tower flange connection elements is less than 50 cm.

3. The crane according to claim 1, wherein the crane further comprises a wire and pulley system comprising the lifting wire and the lifting member.

4. The crane according to claim 3, wherein the wire and pulley system comprises a lower pulley block comprising a pulley and an upper pulley block comprising at least one more pulley than the lower pulley block, the upper pulley block comprising the lifting member and the lower pulley block comprising a first connection element suitable for establishing a detachable connection to the lifting member and a second connection element suitable for establishing a detachable connection to a crane hoisting connection element arranged on a tower section of a wind turbine tower when the crane is connected to a tower section.

5. The crane according to claim 1, wherein the crane further comprises a moment compensating mechanism comprising a moment compensating arm which is at least 300 cm long and which extends out from the crane with a horizontal component, an end of said arm being connected via a wire to a winch located remotely from the crane.

6. The crane according to claim 1, wherein a length of the lifting boom is such that a vertical distance between a highest location of the lifting member and the tower flange connection elements is greater than 5 m, greater than 10 m or greater than 20 m.

7. The crane according to claim 6, wherein said vertical distance is greater than a height of a tower section of the wind turbine tower section.

* * * * *